(12) United States Patent
Peuhkurinen et al.

(10) Patent No.: US 10,614,734 B2
(45) Date of Patent: *Apr. 7, 2020

(54) DISPLAY APPARATUS AND METHOD OF DISPLAYING USING CONTROLLABLE SCANNING MIRROR

(71) Applicant: Varjo Technologies Oy, Helsinki (FI)

(72) Inventors: Ari Antti Erik Peuhkurinen, Helsinki (FI); Oiva Arvo Oskari Sahlsten, Salo (FI); Klaus Mikael Melakari, Oulu (FI)

(73) Assignee: Varjo Technologies Oy, Helsinki (FI)

( * ) Notice: Subject to any disclaimer, the term of this patent is extended or adjusted under 35 U.S.C. 154(b) by 67 days.

This patent is subject to a terminal disclaimer.

(21) Appl. No.: 15/913,283

(22) Filed: Mar. 6, 2018

(65) Prior Publication Data

US 2019/0279546 A1 Sep. 12, 2019

(51) Int. Cl.
*G06T 17/00* (2006.01)
*G09G 3/02* (2006.01)
(Continued)

(52) U.S. Cl.
CPC ............... *G09G 3/02* (2013.01); *G02B 26/10* (2013.01); *G02B 26/101* (2013.01);
(Continued)

(58) Field of Classification Search
CPC ........ G06F 3/0421; G06F 3/012; G06F 3/013; G06T 19/006; G06T 15/00; G09G 2320/068
See application file for complete search history.

(56) References Cited

U.S. PATENT DOCUMENTS 5,119,074 A * 6/1992 Greaves ................... G09G 1/16
345/603
9,711,114 B1 7/2017 Konttori et al.
(Continued)

FOREIGN PATENT DOCUMENTS

DE 102012223010 A1 6/2016
WO 2018/191040 A1 10/2018
WO 2018191040 A1 10/2018

OTHER PUBLICATIONS

Partial International Search Report and Provisional Opinion Received for International Patent Application No. PCT/FI2019/050167, dated Jun. 14, 2019, 11 pages.
(Continued)

*Primary Examiner* — Weiming He
(74) *Attorney, Agent, or Firm* — Ziegler IP Law Group, LLC

(57) ABSTRACT

A display apparatus including at least one image renderer; light sources; controllable scanning mirrors; at least two actuators associated with the controllable scanning mirrors; means for detecting gaze direction of user; and a processor communicably coupled to the aforementioned components. The processor is configured to: (a) obtain an input image and determine region of visual accuracy thereof; (b) process the input image to generate a context image and a focus image; (c) determine a focus area within a projection surface over which the focus image is to be drawn; (d) render the context image; (e) draw the focus image; and (f) control the actuators to align the controllable scanning mirrors. The processor is configured to perform (d), (e) and (f) substantially simultaneously, and optically combine a projection of the drawn focus image with a projection of the rendered context image to create a visual scene.

21 Claims, 5 Drawing Sheets

(51) Int. Cl.
- *G02B 26/10* (2006.01)
- *H04N 9/31* (2006.01)
- *G02B 27/00* (2006.01)
- *G06F 3/01* (2006.01)
- *G02B 27/01* (2006.01)
- *H04N 13/383* (2018.01)
- *H04N 13/365* (2018.01)

(52) U.S. Cl.
CPC ..... *G02B 27/0093* (2013.01); *G02B 27/0172* (2013.01); *G06F 3/013* (2013.01); *H04N 9/3129* (2013.01); *H04N 9/3164* (2013.01); *H04N 9/3188* (2013.01); *G02B 2027/0132* (2013.01); *G02B 2027/0147* (2013.01); *G09G 2340/0407* (2013.01); *G09G 2354/00* (2013.01); *G09G 2360/18* (2013.01); *H04N 13/365* (2018.05); *H04N 13/383* (2018.05)

(56) References Cited

U.S. PATENT DOCUMENTS

| | | | |
|---|---|---|---|
| 2010/0149073 A1* | 6/2010 | Chaum | G02B 27/0093 345/8 |
| 2016/0274365 A1 | 9/2016 | Bailey et al. | |
| 2018/0035087 A1 | 2/2018 | Xu | |
| 2018/0284234 A1* | 10/2018 | Curatu | G01S 7/4817 |
| 2018/0357794 A1* | 12/2018 | Young | G06T 11/001 |

OTHER PUBLICATIONS

International Search Report and Written Opinion of the International Searching Authority of International Application No. PCT/FI2019/050167, dated Jul. 29, 2019, 16 pages.

* cited by examiner

DISPLAY APPARATUS AND METHOD OF DISPLAYING USING CONTROLLABLE SCANNING MIRROR

TECHNICAL FIELD

The present disclosure relates generally to representation of visual information; and more specifically, to display apparatuses comprising image renderers, light sources, controllable scanning mirrors, actuators, means for detecting gaze direction of users and processors. Furthermore, the present disclosure also relates to methods of displaying via the aforementioned display apparatuses.

BACKGROUND

Nowadays, several technologies are being used to present interactive simulated environments to users of specialized devices. Such technologies include virtual reality, augmented reality, mixed reality, and the like. Presently, the users utilize the specialized devices (for example, such as virtual reality headsets, a pair of virtual reality glasses, augmented reality headsets, a pair of augmented reality glasses, mixed reality headsets, a pair of mixed reality glasses, and the like) for experiencing and interacting with such simulated environments. Specifically, the simulated environments enhance the user's experience of reality around him/her by providing the user with a feeling of immersion within the simulated environment, using contemporary techniques such as stereoscopy.

Generally, the specialized devices include displays arranged therein, whereupon images constituting the simulated environments are rendered. Often, such devices have dedicated displays for each eye of the user, for providing different views of a given scene within the simulated environment to the user's eyes. Such different views allow the user to perceive stereoscopic depth within the given scene, thereby, creating the feeling of immersion within the simulated environment. Nowadays, some specialized devices also allow for implementing gaze-contingency therein, thereby, adjusting (namely, controlling) the simulated environment based upon a direction of the user's gaze.

However, conventional specialized devices have certain limitations associated therewith. Firstly, in some existing specialized devices, a position of the displays is fixed. In such a case, the specialized devices include a large number of optical components (such as lenses, mirrors, projectors, and the like) that are movable to implement gaze contingency. Often, an arrangement of such optical components within the specialized devices is complex, and therefore, movement of multiple optical components for implementing gaze-contingency is very cumbersome. Secondly, in some existing specialized devices the displays are movable. Owing to considerable size of such displays, provision of space for their movement makes such specialized devices bulky.

Therefore, in light of the foregoing discussion, there exists a need to overcome the aforementioned drawbacks associated with conventional specialized devices for providing simulated environments.

SUMMARY

The present disclosure seeks to provide a display apparatus.

The present disclosure also seeks to provide a method of displaying, via a display apparatus comprising at least one image renderer, at least one light source per eye, at least one controllable scanning mirror per eye, at least two actuators associated with the at least one controllable scanning mirror and means for detecting a gaze direction of a user.

The present disclosure seeks to provide a solution to the existing problems associated with a large number and size of moving parts for implementing gaze contingency within specialized devices. An aim of the present disclosure is to provide a solution that overcomes at least partially the problems encountered in prior art, and provides a compact and lightweight display apparatus that eliminates aforesaid inaccuracies in the existing specialized devices for providing gaze-contingent simulated environments.

In one aspect, an embodiment of the present disclosure provides a display apparatus comprising:

at least one image renderer;

at least one light source per eye, the at least one light source being operable to emit a substantially collimated and monochromatic light beam;

at least one controllable scanning mirror per eye, the at least one controllable scanning mirror being arranged to reflect the light beam towards a projection surface, wherein the at least one scanning mirror is to be controlled to change a direction in which the light beam is reflected;

at least two actuators associated with the at least one controllable scanning mirror;

means for detecting a gaze direction of a user, wherein the gaze direction is to be detected when the display apparatus in operation is worn by the user; and a processor coupled in communication with the at least one image renderer, the at least one light source, the at least one controllable scanning mirror, the at least two actuators and the means for detecting the gaze direction, wherein the processor is configured to:

(a) obtain an input image and determine, based upon the detected gaze direction of the user, a region of visual accuracy of the input image;

(b) process the input image to generate at least a context image and a focus image, the context image having a first resolution, the focus image having a second resolution, the second resolution being higher than the first resolution, wherein the focus image substantially corresponds to the region of visual accuracy of the input image;

(c) determine, based upon the detected gaze direction of the user, a focus area within the projection surface over which the focus image is to be drawn, the focus area being only a portion of an entire projection area of the projection surface;

(d) render the context image via the at least one image renderer;

(e) draw the focus image via the at least one light source and the at least one controllable scanning mirror; and (f) control the at least two actuators to align the at least one controllable scanning mirror in a manner that the focus image is drawn over the determined focus area within the projection surface, wherein the processor is configured to perform (d), (e) and (f) substantially simultaneously, and wherein a projection of the drawn focus image is optically combined with a projection of the rendered context image to create a visual scene.

In another aspect, an embodiment of the present disclosure provides a method of displaying, via a display apparatus comprising at least one image renderer, at least one light source per eye, at least one controllable scanning mirror per eye, at least two actuators associated with the at least one controllable scanning mirror and means for detecting a gaze direction of a user, the method comprising:

(a) obtaining an input image and determining, based upon the detected gaze direction of the user, a region of visual accuracy of the input image;

(b) processing the input image to generate at least a context image and a focus image, the context image having a first resolution, the focus image having a second resolution, the second resolution being higher than the first resolution, wherein the focus image substantially corresponds to the region of visual accuracy of the input image;

(c) determining, based upon the detected gaze direction of the user, a focus area within a projection surface over which the focus image is to be drawn, the focus area being only a portion of an entire projection area of the projection surface;

(d) rendering the context image via the at least one image renderer;

(e) drawing the focus image via the at least one light source and the at least one controllable scanning mirror, wherein the step of drawing comprises driving the at least one light source to emit a substantially collimated and monochromatic light beam and driving the at least one controllable scanning mirror to change a direction in which the light beam is reflected; and (f) controlling the at least two actuators to align the at least one controllable scanning mirror in a manner that the focus image is drawn over the determined focus area within the projection surface, wherein the steps (d), (e) and (f) are performed substantially simultaneously, and wherein a projection of the drawn focus image is optically combined with a projection of the rendered context image to create a visual scene.

Embodiments of the present disclosure substantially eliminate or at least partially address the aforementioned problems in the prior art, and enables substantially simpler and convenient implementation of gaze-contingency within the aforesaid display apparatus as compared to conventional display apparatuses.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
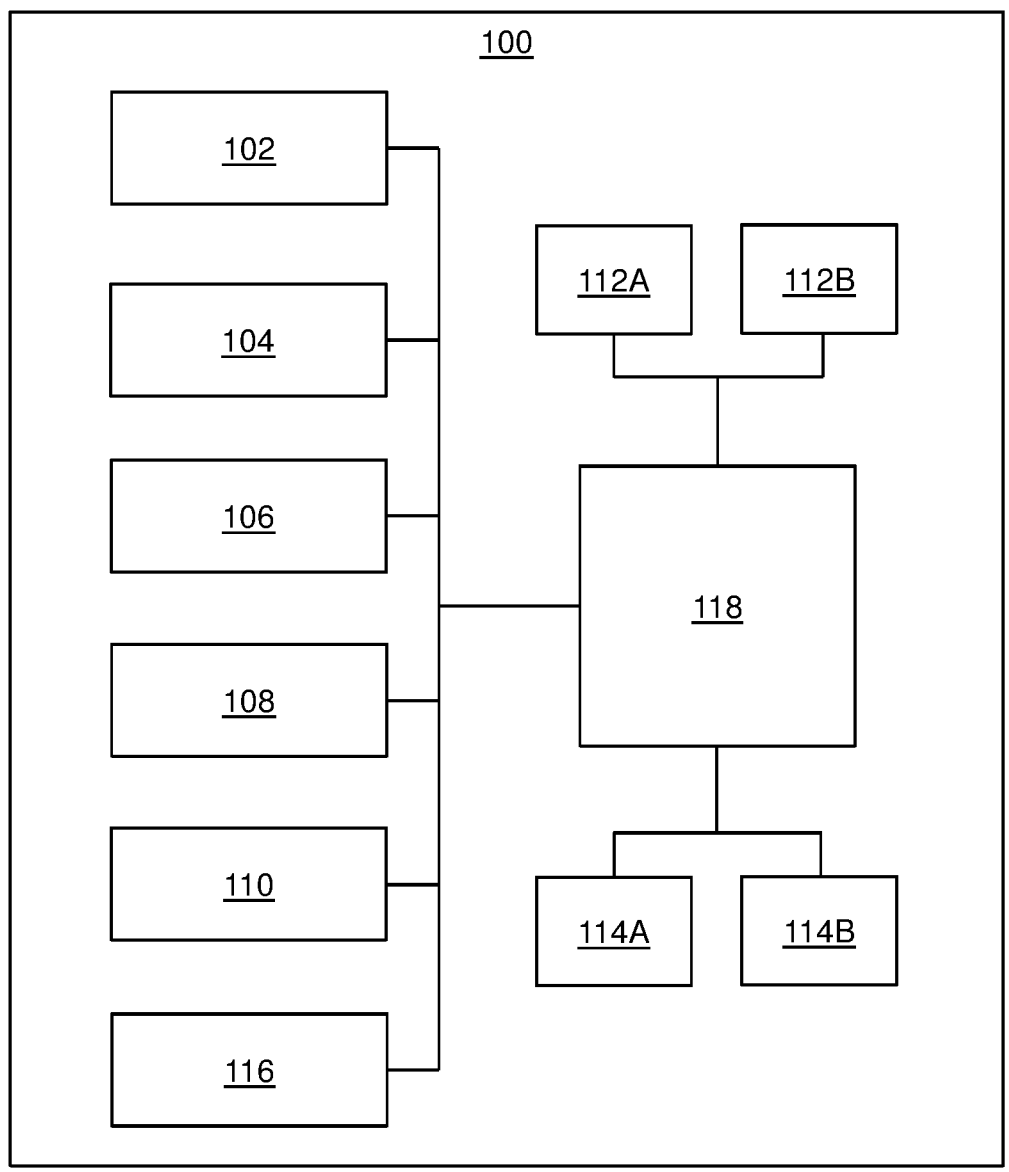
FIG. 1 illustrates a block diagram of architecture of a display apparatus, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a display apparatus comprising:

at least one image renderer;

at least one light source per eye, the at least one light source being operable to emit a substantially collimated and monochromatic light beam;

at least one controllable scanning mirror per eye, the at least one controllable scanning mirror being arranged to reflect the light beam towards a projection surface, wherein the at least one scanning mirror is to be controlled to change a direction in which the light beam is reflected;

at least two actuators associated with the at least one controllable scanning mirror;

means for detecting a gaze direction of a user, wherein the gaze direction is to be detected when the display apparatus in operation is worn by the user; and a processor coupled in communication with the at least one image renderer, the at least one light source, the at least one controllable scanning mirror, the at least two actuators and the means for detecting the gaze direction, wherein the processor is configured to:

(a) obtain an input image and determine, based upon the detected gaze direction of the user, a region of visual accuracy of the input image;

(b) process the input image to generate at least a context image and a focus image, the context image having a first resolution, the focus image having a second resolution, the second resolution being higher than the first resolution, wherein the focus image substantially corresponds to the region of visual accuracy of the input image;

(c) determine, based upon the detected gaze direction of the user, a focus area within the projection surface over which the focus image is to be drawn, the focus area being only a portion of an entire projection area of the projection surface;

(d) render the context image via the at least one image renderer;

(e) draw the focus image via the at least one light source and the at least one controllable scanning mirror; and (f) control the at least two actuators to align the at least one controllable scanning mirror in a manner that the focus image is drawn over the determined focus area within the projection surface, wherein the processor is configured to perform (d), (e) and (f) substantially simultaneously, and wherein a projection of the drawn focus image is optically combined with a projection of the rendered context image to create a visual scene.

In another aspect, an embodiment of the present disclosure provides a method of displaying, via a display apparatus comprising at least one image renderer, at least one light source per eye, at least one controllable scanning mirror per eye, at least two actuators associated with the at least one controllable scanning mirror and means for detecting a gaze direction of a user, the method comprising:

(a) obtaining an input image and determining, based upon the detected gaze direction of the user, a region of visual accuracy of the input image;

(b) processing the input image to generate at least a context image and a focus image, the context image having a first resolution, the focus image having a second resolution, the second resolution being higher than the first resolution, wherein the focus image substantially corresponds to the region of visual accuracy of the input image;

(c) determining, based upon the detected gaze direction of the user, a focus area within a projection surface over which the focus image is to be drawn, the focus area being only a portion of an entire projection area of the projection surface;

(d) rendering the context image via the at least one image renderer;

(e) drawing the focus image via the at least one light source and the at least one controllable scanning mirror, wherein the step of drawing comprises driving the at least one light source to emit a substantially collimated and monochromatic light beam and driving the at least one controllable scanning mirror to change a direction in which the light beam is reflected; and (f) controlling the at least two actuators to align the at least one controllable scanning mirror in a manner that the focus image is drawn over the determined focus area within the projection surface, wherein the steps (d), (e) and (f) are performed substantially simultaneously, and wherein a projection of the drawn focus image is optically combined with a projection of the rendered context image to create a visual scene.

The present disclosure provides the aforementioned display apparatus and the aforementioned method of displaying, via such a display apparatus. The display apparatus described herein is not limited in operation by number of components and arrangement of such components within the display apparatus. Notably, the described display apparatus includes few, small-sized moving components for implementing gaze contingency in real-time or near-real time. For example, merely adjusting an alignment of the controllable scanning mirror allows for implementing gaze-contingency within the display apparatus. Therefore, implementation of gaze-contingency within the aforesaid display apparatus is substantially simpler and convenient as compared to conventional display apparatuses. Moreover, the aforesaid display apparatus is compact and lightweight.

Throughout the present disclosure, the term "display apparatus" used herein relates to specialized equipment that is configured to display a visual scene of a simulated environment to the user of the display apparatus when the display apparatus is worn by the user on his/her head. In such an instance, the display apparatus is operable to act as a device (for example, such as a virtual reality headset, an augmented reality headset, a mixed reality headset, a pair of virtual reality glasses, a pair of augmented reality glasses, a pair of mixed reality glasses and so forth) for presenting the simulated environment to the user.

Throughout the present disclosure, the term "image renderer" used herein relates to equipment for rendering at least one constituent image of the visual scene. The at least one image renderer is configured to render at least the context image. Therefore, it is to be understood that the at least one image renderer may also be referred to as "at least one context image renderer".

Throughout the present disclosure, the term "projection surface" used herein relates to a surface adapted to facilitate display of the at least one constituent image of the visual scene. Notably, the projection surface has transmittance and reflectance specifications that are suitable for receiving at least the substantially collimated and monochromatic light beam to display the focus image thereon. It will be appreciated that the focus image could be drawn over the projection surface from either or both of: a front side of the projection surface, a back side of the projection surface. Optionally, the projection surface is further configured to display the context image thereon.

Optionally, the display apparatus includes a projection surface per eye of the user. In such a case, separate focus images for a left eye and a right eye of the user are rendered using the separate projection surfaces. The separate focus images for the left eye and the right eye of the user collectively constitute the focus image. Alternatively, optionally, a single projection surface is used for both eyes of the user on a shared basis. In such a case, the single projection surface is used to render the separate focus images for both the left eye and the right eye of the user on a shared basis.

Optionally, the projection surface is the retina of the user's eye. In such a case, the separate focus images are drawn over the retinas of both the left eye and the right eye of the user.

Optionally, the at least one image renderer comprises the projection surface, the context image being projected onto the projection area of the projection surface. Optionally, in this regard, the at least one image renderer further comprises at least one context image projector for projecting the context image onto the projection surface. Notably, the context image could be projected on the entire projection area of the projection surface or on only a given portion of the entire projection area. It will be appreciated that in such an implementation, the projection surface allows for displaying both the context and focus images. Therefore, in such a case, the projection surface serves as an optical combiner for optically combining the projections of the rendered context image and the drawn focus images to create the visual scene.

Optionally, the at least one context image projector is selected from the group consisting of: a Liquid Crystal Display (LCD)-based projector, a Light Emitting Diode (LED)-based projector, an Organic LED (OLED)-based projector, a Liquid Crystal on Silicon (LCoS)-based projector, a Digital Light Processing (DLP)-based projector, and a laser projector.

Optionally, the at least one image renderer comprises at least one display for rendering the context image, wherein the at least one display comprises a multi-layered structure, and wherein the projection surface is implemented by way of at least one layer of the multi-layered structure. In such a case, transmittance and reflectance specifications of remaining layers of the multi-layered structure are suitable to allow for drawing the focus image over the focus area within the projection surface. For sake of simplicity, such at least one display can be referred to as "at least one context display".

Optionally, the at least one display is selected from the group consisting of: a Liquid Crystal Display (LCD), a Light Emitting Diode (LED)-based display, an Organic LED (OLED)-based display, a micro OLED-based display, and a Liquid Crystal on Silicon (LCoS)-based display.

Throughout the present disclosure, the term "light source" used herein relates to equipment used to emit the substantially collimated and monochromatic light beam. Optionally, in such a case, the at least one light source comprises at least one collimating element (for example, such as a collimating lens) to adjust cross section of the at least one light beam. Furthermore, optionally, the at least one light source comprises an optical filter configured to allow only light of a given wavelength or a given wavelength range to pass therethrough, and be consequently emitted from the light source. Examples of the at least one light source include, but are not limited to, a laser diode, a solid state laser, a synchrotron.

It will be appreciated that the at least one light source emits at least one light beam towards the at least one controllable scanning mirror. In such a case, the at least one light beam is associated with at least one optical path. As an example, the display apparatus may comprise two light sources per eye, wherein the four light sources emit four substantially collimated and monochromatic light beams having four different optical paths.

For sake of simplicity and clarity, the term "at least one light source" is hereinafter referred to as "a light source".

Throughout the present disclosure, the term "controllable scanning mirror" used herein relates to a solid-state mirror that can be controlled to steer the light beam incident thereupon, for optically scanning the focus image. In such a case, the at least one controllable scanning mirror is adjustable (namely, via tilting, rotation and so forth) in one dimension or in two dimensions to reflect the light beam towards the projection surface. Notably, the processor is configured to control the at least one scanning mirror for changing the direction in which the light beam is reflected. Examples of controllable scanning mirror include, but are not limited to, a micro-electro-mechanical systems (MEMS) mirror and a micro-opto-electro-mechanical systems (MO-EMS) mirror.

For sake of simplicity and clarity, the term "at least one controllable scanning mirror" is hereinafter referred to as "a controllable scanning mirror".

Furthermore, the at least two actuators associated with the at least one controllable scanning mirror allow for implementing the aforesaid adjustment (or movement) of the controllable scanning mirror. Optionally, at least one actuator is configured to move the controllable scanning mirror in a first dimension and at least one actuator is configured to move the controllable scanning mirror in a second dimension. Optionally, the processor is configured to generate an actuation signal (for example, such as an electric current, hydraulic pressure, and so forth) for controlling the at least two actuators.

In an example, one actuator associated with the controllable scanning mirror may be operable to tilt the controllable scanning mirror about a horizontal axis (namely, an x-axis) and another actuator associated with the controllable scanning mirror may be operable to tilt the controllable scanning mirror about a vertical axis (namely, a y-axis), for steering the light beam towards the projection surface.

Throughout the present disclosure, the term "means for detecting gaze direction" used herein relates to specialized equipment for detecting a direction of gaze (namely, a gaze direction) of the user. The display apparatus uses the means for detecting gaze direction for determining aforesaid gaze direction via non-invasive techniques when the display apparatus is worn by the user. Beneficially, an accurate detection of the gaze direction facilitates the display apparatus to closely implement gaze contingency thereon. As an example, the means for detecting gaze direction may be employed to detect the gaze direction of the user's eye, for projecting the rendered focus image on and around fovea of the user's eye and for projecting the rendered context image on a retina of the user's eye, of which the fovea is just a small part. Therefore, even upon a change in the gaze direction (namely, due to a movement of the user's eye), the rendered focus image is projected on and around the fovea and the rendered context image is projected on the retina, for implementing active foveation in the display apparatus.

It is to be understood that the means for detecting gaze direction may also be referred to as a "means for tracking a gaze direction", a "gaze-tracking system", an "eye-tracker system", or a "gaze-tracking unit".

The processor is coupled in communication with the at least one image renderer, the at least one light source, the at least one controllable scanning mirror, the at least two actuators and the means for detecting the gaze direction. In an embodiment, the processor is implemented by way of hardware, software, firmware or a combination of these, suitable for controlling the operation of the display apparatus. Notably, the processor is configured to control the operation of the display apparatus to process and display the visual scene to the user, when the user uses the display apparatus (for example, by wearing the display apparatus on his/her head).

The processor is configured to obtain the input image and determine, based upon the detected gaze direction of the user, the region of visual accuracy of the input image. Throughout the present disclosure, the term "input image" used herein relates to an image of the visual scene that is to be displayed via the display apparatus. The input image depicts (namely, represents) the simulated environment to be presented to the user.

In an embodiment, the input image is obtained from an imaging device coupled to the display apparatus. In such a case, the imaging device (for example, such as a pass-through digital camera) is configured to capture an image of a real-world environment as the input image.

In another embodiment, the input image is obtained from a memory unit coupled in communication with the processor. Optionally, the memory unit is implemented by way of hardware, software, firmware or a combination of these, suitable for storing the input image. The input image is stored in a suitable format, for example, such as Motion Picture Experts Group (MPEG), Joint Photographic Experts Group (JPEG), Tagged Image File Format (TIFF), Portable Network Graphics (PNG), Graphics Interchange Format (GIF), Bitmap file format (BMP) and the like.

In yet another embodiment, the input image is a computer generated image. In such a case, the processor is configured to generate the input image.

Furthermore, it is to be understood that the term "region of visual accuracy" relates to a region of the input image whereat the detected gaze direction of the eyes of the user is directed (namely, focused) when the user views the image. Therefore, the region of visual accuracy is a fixation region within the input image. In other words, the region of visual accuracy is a region of interest (or a fixation region) within the input image, and is projected onto the fovea of the user's eyes. Therefore, the region of visual accuracy relates to a region resolved to a much greater detail as compared to other regions of the input image, when the input image is viewed by the human visual system.

The processor is configured to process the input image to generate at least the context image and the focus image. Notably, the context image relates to a wide image of the visual scene that is to be presented to the user via the display apparatus. Furthermore, the focus image relates to another image depicting a part (namely, a portion) of the visual scene that is to be presented to the user via the display apparatus. It will be appreciated that the context and focus images collectively constitute the visual scene upon optical combination thereof.

Optionally, an angular width of the projection of the rendered context image ranges from 40 degrees to 220 degrees, whereas an angular width of the projection of the drawn focus image ranges from 5 degrees to 60 degrees. In some implementations, the angular width of the projection of the rendered context image may be, for example, 40, 50, 60, 70, 80, 90, 100, 110, 120, 130, 140, 150, 160, 170, 180, 190, 200, 210 or 220 degrees, whereas the angular width of the projection of the drawn focus image may be, for example, 5, 10, 15, 20, 25, 30, 35, 40, 45, 50, 55 or 60 degrees. In other implementations, the angular width of the projection of the rendered context image is greater than 220 degrees. It will be appreciated that the aforesaid angular widths of the context and focus images allow for coping with saccades and microsaccades associated with movement of the user's eyes.

Throughout the present disclosure, the term "angular width" refers to an angular width of a given projection as seen from the user's eyes, when the display apparatus is worn by the user. It will be appreciated that the angular width of the projection of the drawn focus image is smaller than the angular width of the projection of the rendered context image, since the drawn focus image is typically projected on and around the fovea of the user's eyes, whereas the rendered context image is projected upon the retina of the user's eyes.

The context image has the first resolution whereas the focus image has the second resolution. The second resolution is higher than the first resolution. The focus image substantially corresponds to the region of visual accuracy of the input image. Notably, the context image relates to a low-resolution representation of the input image. Therefore, the context image includes the region of visual accuracy of the input image along with remaining region of the input image. The second resolution is higher than the first resolution since the focus image is typically projected by the display apparatus on and around the fovea of the user's eyes, whereas the context image is projected by the display apparatus upon a remaining region of the retina of the user's eyes. Such resolution of the focus and context images allow for emulating visual characteristics of the human visual system when the input image is viewed by the user of the display apparatus.

Furthermore, the first and second resolutions are to be understood in terms of angular resolution. In other words, pixels per degree indicative of the second resolution are higher than pixels per degree indicative of the first resolution. As an example, the fovea of the eye of the user corresponds to 2 degrees of visual field and receives the projection of the drawn focus image of angular cross section width equal to 114 pixels indicative of 57 pixels per degree. Therefore, an angular pixel size corresponding to the focus image would equal $2/114$ or 0.017. Furthermore, in such an example, the retina of the eye corresponds to 180 degrees of visual field and receives the projection of the context image of angular cross section width equal to 2700 pixels indicative of 15 pixels per degree. Therefore, an angular pixel size corresponding to the context image would equal $180/2700$ or 0.067. As calculated, the angular pixel size corresponding to the context image is clearly much larger than the angular pixel size corresponding to the focus image. However, a perceived angular resolution indicated by a total number of pixels is greater for the context image as compared to the focus image since the focus image corresponds to only a part of the context image, wherein the part corresponds to the region of visual accuracy of the input image.

It will be appreciated that a size (namely, dimensions) of the context image is larger than a size (namely, dimensions) of the focus image, since the focus image corresponds to only a portion of the input image whereat the detected gaze direction of the eyes may be focused (namely, at the region of visual accuracy of the input image) whereas the context image corresponds to the entire input image.

It will be appreciated that more than two images with mutually different resolutions can also be generated. As an example, the processor may be configured to generate a third image with a third resolution, wherein the third resolution is higher than the first resolution, but lesser than the second resolution. In such an example, the third resolution is an intermediary resolution, and the third image can be generated for being projected onto an area adjacent to the border of the focus area (namely, along a periphery or border of the context and focus images).

The processor is configured to determine, based upon the detected gaze direction of the user, the focus area within the projection surface over which the focus image is to be drawn, the focus area being only the portion of an entire projection area of the projection surface. Notably, when the entire projection area of the projection surface substantially corresponds to the input image, the focus area substantially corresponds to the region of visual accuracy of the input image. Therefore, a location of the focus area within the projection surface substantially corresponds to a location of the region of visual accuracy of the input image within the input image. In an example, based upon the detected gaze direction of the user, the region of visual accuracy of the input image may be located at a center portion of the input image. Therefore, the focus area may be determined to be located substantially at a center portion of the projection surface. In another example, based upon the detected gaze direction of the user, the region of visual accuracy of the input image may be located at a top left portion of the input image. Therefore, the focus area may be determined to be located substantially at a top left portion of the projection surface. It will be appreciated that a shape of the focus area substantially corresponds to a shape of the region of visual accuracy of the input image. Notably, the focus area can have a shape including, but not limited to, a rectangle, a circle, a polygon, an ellipse, and a freeform shape.

The processor is configured to render the context image via the at least one image renderer. In an implementation, when the at least one image renderer comprises the projection surface, the processor is configured to control the at least one context image projector to project the context image onto the projection surface. In another implementation, when the at least one image renderer comprises at least one display, the processor is configured to control the at least one display to render the context image thereat.

The processor is configured to draw the focus image via the at least one light source and the at least one controllable scanning mirror, and control the at least two actuators to align the at least one controllable scanning mirror in a manner that the focus image is drawn over the determined focus area within the projection surface. In operation, the processor controls the light source to emit the light beam therefrom. The light beam is incident upon the controllable scanning mirror wherefrom the light beam is reflected towards the projection screen for drawing the focus image. Notably, the controllable scanning mirror is aligned to control a location within the projection area whereat the light beam reflected from the controllable scanning mirror would be incident. Specifically, via one-dimensional alignment and/or two-dimensional alignment of the controllable scanning mirror, the light beam is made incident upon the focus area within the projection surface, for drawing the focus image over the focus area. Furthermore, the region of the visual accuracy of the input image, and consequently, a location of the focus area changes with change in the gaze direction of the user. In such an instance, the at least two actuators align the controllable scanning mirror in a manner that the location of incidence of the light beam changes in accordance with change in the location of the focus area. Therefore, the light beam reflected from the controllable scanning mirror draws the focus image within the determined focus area, even upon the change in gaze direction of the user.

It will be appreciated that the processor is configured to perform the steps (d), (e) and (f) substantially simultaneously in order to avoid time lag between rendering of the context image and drawing of the focus image. Therefore, the projection of the drawn focus image is optically combined with the projection of the rendered context image, to create the visual scene with none or minimal time lag and minimal optical distortion.

Optionally, the projection of the rendered context image and the projection of the drawn focus image are optically combined at the projection surface. Such optical combination occurs in an instance wherein the at least one image renderer comprises the projection surface and the context image is projected onto the projection area of the projection surface.

Optionally, the projection of the rendered context image and the projection of the drawn focus image are optically combined at the at least one context display having the multi-layered structure, when the at least one context display is employed for implementing the at least one image renderer.

Optionally, the processor is configured to generate an offset signal based upon the location of the focus area relative to the entire projection area of the projection surface, and to control the at least two actuators using the offset signal to align the at least one controllable scanning mirror. Throughout the present disclosure, the term "offset signal" used herein refers to a control signal (namely, a bias) associated with the at least two actuators, wherein the offset signal allows the at least two actuators to align the controllable scanning mirror such that the light beam reflected from the controllable scanning mirror is incident at the location of the focus area. Therefore, the offset signal is used to align the controllable scanning mirror in a manner that the focus image is drawn over the determined focus area within the projection surface.

Optionally, the offset signal comprises at least one of: an x-axis offset, a y-axis offset. As an example, the offset signal may comprise both the x-axis offset (namely, the horizontal axis offset) and the y-axis offset (namely, the vertical axis offset) to align the controllable scanning horizontally and vertically, respectively. In such an example, the location of the focus area relative to the entire projection area of the projection surface may be at a top right region of the projection surface.

Optionally, a default alignment of the controllable scanning mirror is such that the light beam reflected therefrom is incident upon a central portion of the entire projection area of the projection surface. In one exemplary scenario, when the detected gaze direction of the user, and consequently, the region of visual accuracy is at a central portion of the input image, the determined location of the focus area may be at the central portion of the entire projection area. Therefore, in such an instance, the offset signal may not be generated since the controllable scanning mirror is already aligned in a manner that the light beam reflected therefrom would be incident upon the requisite location of the focus area relative to the entire projection area of the projection surface. In another exemplary scenario, when the detected gaze direction of the user, and consequently, the region of visual accuracy is at a top right portion of the input image, the determined location of the focus area may be at the top right portion of the entire projection area. Therefore, in such an instance, the offset signal may be generated, based upon the location of the focus area relative to the entire projection area of the projection surface, for adjusting the alignment of the controllable scanning mirror from its default alignment to a new alignment. For example, the offset signal may comprise both the x-axis offset and the y-axis offset. It will be appreciated that the offset signal changes with the change in the gaze direction of the user, since the change in the gaze direction leads to a change in the location of the focus area relative to the entire projection area of the projection surface.

Optionally, the processor is configured to drive the at least one light source based upon pixel data of the focus image and a scanning pattern swept by the at least one controllable scanning mirror. The term "pixel data" used herein relates to information pertaining to a single pixel or a set of pixels within an entire pixel array associated with the focus image. Furthermore, the term "scanning pattern" relates to a pattern that defines a manner in which the light beam scans the focus area to draw the focus image. Specifically, a nature of the light beam (for example, wavelength of the light beam, intensity of the light beam, and so forth) emitted from the light source can be adjusted based upon the aforesaid pixel data and the scanning pattern.

Optionally, the pixel data of the focus image is stored in a frame buffer. The frame buffer relates to a portion of a memory that is used to drive the light source. The light source is driven based upon the aforesaid pixel data to draw the focus image within the focus area according to the scanning pattern. Furthermore, each frame of data in the frame buffer comprises the pixel data pertaining to all pixels of the focus image. For example, the pixel data may include information such as, but not limited to size of the pixels of the focus image, colors of the pixels of the focus image, intensity associated with the pixels of the focus image, positions of the pixels of the focus image, arrangement of the pixels of the focus image, and total number of pixels of the focus image.

It will be appreciated that a shape of the scanning pattern is a function of movement of the controllable scanning mirror about its horizontal and vertical axes. Examples of the scanning pattern include, but are not limited to, a raster scan pattern and a lissajous scanning pattern. For example, in the raster scan pattern, the light beam is swept both horizontally and vertically across the focus area, wherein the horizontal sweep allows for drawing a row of pixels of the focus image and the vertical sweep allows for drawing all rows of the pixels of the focus image. In other words, the light beam is swept across the focus area, one row at a time, for all the rows of pixels. Notably, the aforesaid horizontal scanning of a given row may be bidirectional, namely, from left to right direction or from right to left direction within the given row. Furthermore, the vertical scanning across the rows may be from a top row to a bottom row or from the bottom row to the top row. Furthermore, optionally, the light beam is turned off whilst scanning (namely, horizontally retracing) from end of one row to a beginning of its subsequent row, thereby creating a pattern of illuminated spots in a row as the light beam moves across each row. Moreover, optionally, upon scanning all rows, the light beam is directed towards a starting point of the raster scan pattern, thereby constituting a vertical retrace.

Optionally, the processor is configured to repeat (a) to (f) for a sequence of input images. In such a case, upon repeating the steps (a) to (f) for the sequence of input images, a sequence of visual scenes are produced (for example, representing a video). When repeating the steps (a) to (f) for a given input image, the processor is configured to:

(g) change a location of the focus area on the projection surface for a given focus image that has been generated for the given input image, based upon the change in the gaze direction of the user as detected by the means for detecting the gaze direction;

(h) control the at least two actuators to re-align the at least one controllable scanning mirror with respect to the change in the location of the focus area on the projection surface;

(i) predict an extent to which the at least one controllable scanning mirror ripples when re-aligned; and (j) determine which pixel of the given focus image is to be drawn with the at least one light source at a given point of time. It will be appreciated that upon repeating the steps (a) to (f) for the sequence of input images, a sequence of context images and a sequence of focus images are generated and optically combined for producing the sequence of visual scenes. In such a case, a given focus image is drawn based upon a current gaze direction of the user, thereby, reducing or possibly, removing the ripple associated with the controllable scanning mirror.

Optionally, in the step (g), the change of the location of the focus area occurs in real time or near-real time. In the step (g), based upon the change in the gaze direction of the user, the region of visual accuracy of the input image also changes. The change in the region of the visual accuracy of the input image consequently results in the change in the location of the focus area on the portion of the projection surface upon which the focus image is to be drawn. It will be appreciated that the aforementioned change in the location of the focus area results in generation of the offset signal to align the controllable scanning mirror suitably.

Optionally, in the step (h), the at least two actuators re-align the at least one controlling scanning mirror by way of at least one of: rotation of the at least one controlling scanning mirror, tilting of the at least one controlling scanning mirror, displacement of the at least one controlling scanning mirror. In such a case, the controllable scanning mirror is re-aligned in at least one dimension according to the change in the location of the focus area. It will be appreciated that the controllable scanning mirror is coupled to the at least two actuators via a flexible (namely, non-rigid) suspension arrangement. Furthermore, the controllable scanning mirror has a specific mass associated therewith. Therefore, the re-alignment of the controllable scanning mirror induces unwanted oscillations, or ripples, of the controllable scanning mirror.

Optionally, in the step (i), the extent to which the at least one controlling scanning mirror ripples is predicted by way of at least one scanning mirror behaviour predictive algorithm. The term "ripple" used herein relates to a motion (for example, such as a vibratory motion) of the controllable scanning mirror that occurs upon re-alignment of the controllable scanning mirror, before the controllable scanning mirror attains a stable position. Upon the change in the gaze direction, when the at least two actuators re-align the controllable scanning mirror according to the offset signal, the controllable scanning mirror ripples before attaining the stable position. Once the controllable scanning mirror stabilizes upon such re-alignment, it guides the light beam towards the changed location of the focus area. It will be appreciated that the extent to which the at least one controllable scanning mirror ripples is based upon parameters such as, but not limited to, mechanical properties of the at least one controllable scanning mirror and/or the suspension arrangement, scanning speed of the at least one controllable scanning mirror, and the offset signal. Examples of the mechanical properties of the at least one controllable scanning mirror and/or the suspension arrangement include, but are not limited to mass of the at least one controllable scanning mirror, spring constant of elements (for example, such as springs, linkages, and so forth) of the suspension arrangement, and mechanical impedance of the at least one controllable scanning mirror. Furthermore, the mechanical properties of the at least one controllable scanning mirror and/or the suspension arrangement are dynamic (for example, position dependent). As an example, spring constant of an element may be related to an absolute tilt angle of the at least one controllable scanning mirror.

Optionally, the mechanical properties of the at least one controllable scanning mirror and/or the suspension arrangement are temperature-dependent (namely, vary with change in temperature).

Optionally, in the step (j), the determination of which pixel of the given focus image is to be drawn with the light source at the given point of time, is based upon a current region of visual accuracy at the given point of time.

In an embodiment, in the step (j), the processor is configured to predict which pixel of the given focus image is to be drawn with the light source at the given point of time. In such a case, the processor employs a parameterized approximation function having input variables including, but not limited to, the current location of the focus area, a subsequent (namely, successive) location of the focus area and time, for making the aforesaid prediction. The output of the parameterized approximation function is a correct pixel that is to be drawn at the given point of time. Notably, the processor obtains the current gaze direction and the changed gaze direction from the means for detecting the gaze direction, and consequently determines the aforesaid current and subsequent locations of the focus area. It will be appreciated that typically, a time duration of the aforesaid ripple movement of the at least one controllable scanning mirror is of the order of a few milliseconds, and the extent to which the at least one controlling scanning mirror ripples is of the order of a few degrees. However, since the scanning speed of the at least one controllable scanning mirror is often very high (for example, such as tens or hundreds of kilopixels per second), there is likelihood of drawing pixels at incorrect positions whilst the at least one controllable scanning mirror ripples. Conventionally, in such an instance, either the pixels are drawn at incorrect positions in the time duration of the ripple movement or drawing the focus image is suspended whilst the at least one controllable scanning mirror ripples. However, the aforesaid prediction (of which pixel of the given focus image is to be drawn at the given point of time) eliminates the aforesaid conventional problems and allows for drawing the pixels correctly, without temporarily suspending the drawing of the focus image.

In another embodiment, in the step (j), the pixel of the given focus image that is to be drawn, is randomly selected from the frame buffer at the given point of time. It will be appreciated that the random access to the frame buffer allows for drawing pixels to fill the focus area, thereby, accommodating a non-linear scanning action associated with the controllable scanning mirror while it ripples.

Optionally, the processor is configured to generate a scanning signal based upon electromechanical characteristics of the at least one controllable scanning mirror, and to drive the at least one controllable scanning mirror using the scanning signal. The electromechanical characteristics of the controllable scanning mirror relate to parameters associated with electrical driving characteristics and mechanical movement of the controllable scanning mirror. Furthermore, such electromechanical characteristics of the controllable scanning mirror often change with a change in operative environmental conditions (for example, such as humidity, temperature and so forth). The scanning signal relates to a signal that is used for driving the controllable scanning mirror to sweep the scanning pattern. Specifically, the scanning signal allows for controlling a manner in which the focus image is to be drawn via the scanning pattern. For example, a scanning signal that is used for driving the scanning mirror to sweep the raster scan pattern may comprise a horizontal scanning signal (for example, such as a sinusoidal signal) and a vertical scanning signal (for example, such as a saw-tooth signal).

Optionally, in operation, the processor is configured to draw the focus image via the light source and the controllable scanning mirror using the offset signal and the scanning signal. Optionally, in such a case, offset signal is superposed on top of the scanning signal in a manner that the offset signal aligns the controllable scanning mirror in accordance with the location of the focus area and the scanning signal sweeps the scanning pattern within the focus area to draw the focus image. Notably, the at least two actuators align the controllable scanning mirror according to the location of the focus area, via the offset signal. Furthermore, the at least two actuators adjust an alignment of the controllable scanning mirror with respect to the light source, in accordance with the scanning signal, such that the light beam reflected from the controllable scanning mirror sweeps the scanning pattern to draw the focus image.

Optionally, the scanning signal is a phase-locked signal that is synchronous with pixel readout from the frame buffer, the frame buffer storing pixel data of the focus image. In such a case, there is no phase difference between the pixel readout (namely, a signal used to drive the light source) and the scanning signal. It will be appreciated that when the scanning signal is synchronous with the pixel readout from the frame buffer, there exists none or minimum delay between obtaining pixel data from the frame buffer and drawing the focus image within the focus area.

Optionally, the scanning signal is to be generated based upon resonant properties of the at least one controllable scanning mirror. The resonant properties of the controllable scanning mirror relate to a resonant frequency associated with oscillation or vibratory motion of the controllable scanning mirror. Notably, the resonant frequency allows for controlling the scanning speed and a scanning angle of the controllable scanning mirror. Therefore, the scanning signal is generated to match the resonant properties of the controllable scanning mirror for ensuring proper operation of the controllable scanning mirror whilst the focus image is drawn. It will be appreciated that upon change in the gaze direction of the user, the resonant frequency of the controllable scanning mirror may change. As an example, the controllable scanning mirror may vibrate at a higher frequency than its normal operative frequency whilst being re-aligned according to the changed gaze direction. In such an instance, adjusting a frequency of the scanning signal to match a current resonant frequency of the controllable scanning mirror allows for accommodating the non-linear scanning action associated with the controllable scanning mirror while it ripples. In an example, the scanning signal based upon the resonant properties of the controllable scanning mirror may have a scanning speed that allows for a scan rate to be greater than or equal to 30 frames per second.

Optionally, the processor is configured to mask a region of the context image that substantially corresponds to the region of visual accuracy of the input image, wherein the projections of the drawn focus image and the rendered context image are optically combined in a manner that the projection of the drawn focus image substantially overlaps with the projection of the masked region of the rendered context image. In such an instance, the masking is performed by the processor to hide (namely, obscure) or fade the region of the context image corresponding to the region of visual accuracy of the input image. Therefore, the aforesaid masking relates to modifying visual characteristics (for example, such as colour, brightness, and so forth) of the region of the context image that substantially corresponds to the region of visual accuracy of the input image. It will be appreciated that the region of visual accuracy of the input image is represented within both the rendered context image of low resolution and the drawn focus image of high resolution. Moreover, the focus image having a high resolution includes more information (namely, more visual detail) pertaining to the region of visual accuracy of the input image, as compared to the context image having a low resolution. Therefore, the processor beneficially masks the region of the context image that substantially corresponds to the region of visual accuracy of the input image, and overlays the focus image upon such a masked region in order to avoid optical distortion and enhance visual characteristics of the region of visual accuracy of the input image, when the projection of the drawn focus image is optically combined with the projection of the rendered context image. For example, pixels of the context image corresponding to the region of visual accuracy of the input image may be dimmed (or blackened) for masking.

Furthermore, optionally, the masked region of the context image substantially corresponds to the focus area within the projection surface. Optionally, in this regard, the processor is configured to control the at least two actuators using the offset signal to align the controllable scanning mirror in a manner that the light beam (for drawing the focus image) is directed towards the focus area corresponding to the masked region of the rendered context image. In an example, when the context image is projected onto the entire projection area of the projection surface, a region of the projection surface that is associated with the masked region of the context image substantially corresponds to the focus area whereupon the focus image is to be drawn.

Optionally, the processor is configured to mask the region of the context image corresponding to the region of visual accuracy of the input image in a manner that transitional area seams (or edges) between the region of visual accuracy of the input image and remaining region of the input image are reduced, for example minimized. In such an instance, the masking could be performed as a gradual gradation in order to reduce (for example, to minimize) transitional area seams between the projections of the context and focus images so that the visual scene appears continuous. For example, the processor may significantly dim or fade pixels of the context image corresponding to the region of visual accuracy of the input image, and gradually reduce an amount of dimming of the pixels with an increase in distance thereof from the region of visual accuracy of the input image. Furthermore, the masking could be performed using linear transparency mask blend of inverse values between the context image and the focus image at the transition area, stealth (or camouflage) patterns containing shapes naturally difficult for detection by the eyes of the user, and so forth.

Optionally, the display apparatus further comprises an exit optical element. The exit optical element relates to an optical device configured to direct the optically combined projections of the rendered context image and the drawn focus image, towards the user's eyes, when the display apparatus is worn by the user. Furthermore, optionally, the exit optical element is configured to alter an optical path and/or optical characteristics of the projection of the rendered context image and/or the projection of the drawn focus image.

In one example, the exit optical element may magnify a size (or angular dimensions) of the projection of the drawn focus image. In such a case, use of a magnifying exit optical element allows for use of dimensionally small components within the display apparatus.

Optionally, the exit optical element is implemented by way of at least one of: a convex lens, a plano-convex lens, a Liquid Crystal (LC) lens, a liquid lens, a Fresnel lens, a spherical lens, a chromatic lens.

Optionally, the display apparatus further comprises a light-sensing element for sensing the intensity of light beam and means for stopping the light beam from reaching the users eye, wherein the processor is configured to detect when the intensity of the light beam exceeds a predefined threshold value, and to use said means to stop the light beam when the intensity of the light beam exceeds the predefined threshold value. In such a case, the predefined threshold value relates to an upper safe operation threshold value associated with the light source. Such predefined threshold values are based upon commonly known and practiced safety guidelines. Throughout the present disclosure, the term "fight-sensing element" used herein relates to a specialized device (for example, such as a light sensor) comprising at least one light-sensitive component for detecting the intensity of the light beam incident thereupon. In operation, the processor coupled to the light-sensing element obtains a value of the detected intensity of the light beam, and consequently, detects when the intensity of the light beam exceeds the predefined threshold value. Optionally, the light-sensing element is implemented by way of at least one of: a photo resistor, a photo diode, a photo transistor. As an example, the light-sensing element is implemented by way of a chip including an array of the aforesaid light-sensitive components. Furthermore, the term "means for stopping the light beam" relates to equipment for blocking (namely, obstructing) the light beam from reaching the user's eyes. Examples of the means for stopping the light beam include, but are not limited to, an opaque shutter, an interlock mechanism associated with the light source, a glass filter, a polycarbonate filter. It will be appreciated that the aforesaid means allows for stopping harmful light beam having intensity greater than the predefined threshold value, from reaching the user's eyes. Therefore, the light-sensing element and the means for stopping the light beam ensure protection (namely, safety) of the user's eyes, whilst the user uses the display apparatus.

Optionally, the light-sensing element is arranged on an optical path of the light beam. Furthermore, in this regard, the light-sensing element could also be arranged on an optical path of the projection of the drawn focus image, since the focus image is drawn via the light beam. In an example implementation, the light-sensing element may be arranged between the light source and the controllable scanning mirror. In another example implementation, the light-sensing element may be arranged between the controllable scanning mirror and the projection surface. In yet another example implementation, the light-sensing element may be arranged between the projection surface and the user's eye, on the optical path of the projection of the drawn focus image.

In an embodiment, the light-sensing element is substantially transparent. In such a case, the light-sensing element is configured to: (i) allow the light beam incident thereupon to completely pass therethrough, when the intensity of the light beam is equal to or lower than the predefined threshold value; and (ii) block the light beam incident thereupon from passing therethrough, if the intensity of the light beam is greater than the predefined threshold value. In such a case, the light-sensing element blocks the light beam by way of at least one of: reflection of the light beam, absorption of the light beam.

In another embodiment, the light-sensing element is substantially opaque. Optionally, in such a case, the display apparatus comprises a partially-reflective optical element arranged on the optical path of the light beam, wherein the partially-reflective optical element is configured to reflect at least a portion of the light beam towards the light-sensing element, and to allow the light beam to pass through the partially-reflective optical element when the intensity of the light beam is equal to or lower than the predefined threshold value. In operation, at least a portion of the light beam is reflected by the partially-reflective optical element towards the light-sensing element whereat the intensity of the light beam is detected. If the intensity of the light beam is greater than the predefined threshold value, all of the light beam is reflected towards the light-sensing element to ensure protection of the user's eyes. However, if the intensity of the light beam is equal to or lower than the predefined threshold value, the partially-reflective optical element is configured to pass a remaining portion of the light beam therethrough. It will be appreciated that only a small fraction of the light beam may be reflected towards the light-sensing element for the aforementioned operation.

Optionally, the display apparatus further comprises an accelerometer, the accelerometer being operable to sense a pattern in which the at least one controllable scanning mirror vibrates; and the means for stopping the light beam from reaching the user's eye, wherein the processor is configured to detect when the sensed pattern is different from a predefined pattern that is recognized for the at least one controllable scanning mirror, and to use said means to stop the light beam when the sensed pattern is different from the predefined pattern. Conventionally, the predefined pattern associated with vibration of the controllable scanning mirror vibrates is cyclic. However, the sensed pattern in which the controllable scanning mirror vibrates may be detected to be substantially different from the expected predefined pattern associated therewith, due to inefficiency of the processor, wear and tear or the at least two actuators and/or the controllable scanning mirror, anomalous deflection of the controllable scanning mirror, and the like. Beneficially, the aforesaid arrangement of the accelerometer and the means for stopping the light beam allow for stopping the light beam from reaching the user's eye in an event of such unexpected and undesired vibrations of the controllable scanning mirror, for protection of the user's eye. As an example, according to the predefined pattern that is recognized for the scanning mirror, a time period between such successive cycles may be of the order of a few milliseconds. In such a case, the accelerometer may sense a pattern in which the time period between the successive cycles is of the order of a few microseconds. Therefore, since the scanning mirror is detected to be vibrating much faster than an expected rate, the means for stopping the light beam may be used to stop the light beam from reaching the user's eye.

The present disclosure also relates to the method as described above. Various embodiments and variants disclosed above apply mutatis mutandis to the method.

Optionally, the method further comprises generating an offset signal based upon a location of the focus area relative to the entire projection area of the projection surface; and controlling the at least two actuators using the offset signal to align the at least one controllable scanning mirror.

Optionally, the method further comprises driving the at least one light source based upon pixel data of the focus image and a scanning pattern swept by the at least one controllable scanning mirror.

Optionally, the method further comprises repeating the steps (a) to (f) for a sequence of input images, wherein, when repeating the steps (a) to (f) for a given input image, the method further comprises:

(g) changing a location of the focus area on the projection surface for a given focus image that has been generated for the given input image, based upon a change in the gaze direction of the user as detected by the means for detecting the gaze direction;

(h) controlling the at least two actuators to re-align the at least one controllable scanning mirror with respect to the change in the location of the focus area on the projection surface;

(i) predicting an extent to which the at least one controllable scanning mirror ripples when re-aligned; and (j) determining which pixel of the given focus image is to be drawn with the at least one light source at a given point of time.

Optionally, the method further comprises generating a scanning signal based upon electromechanical characteristics of the at least one controllable scanning mirror; and driving the at least one scanning mirror using the scanning signal.

Optionally, in the method, the scanning signal is a phase-locked signal that is synchronous with pixel readout from a frame buffer, the frame buffer storing pixel data of the focus image.

Optionally, in the method, the scanning signal is generated based upon resonant properties of the at least one controllable scanning mirror.

Optionally, the method further comprises masking a region of the context image that substantially corresponds to the region of visual accuracy of the input image, wherein the projections of the drawn focus image and the rendered context image are optically combined in a manner that the projection of the drawn focus image substantially overlaps with the projection of the masked region of the rendered context image.

Optionally, in the method, the display apparatus further comprises a light-sensing element and means for stopping the light beam from reaching the user's eye, the method comprising sensing, via the light-sensing element, an intensity of the light beam; detecting when the intensity of the light beam exceeds a predefined threshold value; and using said means to stop the light beam when the intensity of the light beam exceeds the predefined threshold value.

Optionally, in the method, the display apparatus further comprises an accelerometer and means for stopping the light beam from reaching the user's eye, the method comprising sensing, via the accelerometer, a pattern in which the at least one controllable scanning mirror vibrates; detecting when the sensed pattern is different from a predefined pattern that is recognized for the at least one controllable scanning mirror; and using said means to stop the light beam when the sensed pattern is different from the predefined pattern.

DETAILED DESCRIPTION OF THE DRAWINGS

Referring to FIG. 1, illustrated is a block diagram of architecture of a display apparatus 100, in accordance with an embodiment of the present disclosure. The display apparatus 100 comprises at least one image renderer, depicted as an image renderer 102; at least one light source per eye, depicted as a light source 104 for a left eye and a light source 106 for a right eye; at least one controllable scanning mirror per eye, depicted as a controllable scanning mirror 108 for the left eye and a controllable scanning mirror 110 for the right eye; at least two actuators associated with the at least one controllable scanning mirrors 108 and 110, depicted as two actuators 112A and 112B associated with the controllable scanning mirror 108 and two actuators 114A and 114B associated with the controllable scanning mirror 110; means 116 for detecting a gaze direction of a user, wherein the gaze direction is to be detected when the display apparatus 100 in operation is worn by the user; and a processor 118 coupled in communication with the at least one image renderer 102, the at least one light source 104 and 106, the at least one controllable scanning mirror 108 and 110, the at least two actuators 112A, 112B, 114A and 114B and the means 116 for detecting the gaze direction. Each of the light sources 104 and 106 are operable to emit a substantially collimated and monochromatic light beam. The controllable scanning mirrors 108 and 110 are arranged to reflect the light beam towards a projection surface (not shown), wherein the scanning mirrors 108 and 110 are to be controlled to change a direction in which the light beam is reflected.

Referring to FIGS. 2A, 2B, 2C and 2D illustrated exemplary implementations of a display apparatus 200, in accordance with various embodiments of the present disclosure. It may be understood by a person skilled in the art that the FIGS. 2A, 2B, 2C and 2D include simplified arrangements for implementation of the display apparatus 200 for sake of clarity, which should not unduly limit the scope of the claims herein. The person skilled in the art will recognize many variations, alternatives, and modifications of embodiments of the present disclosure.

As shown in FIGS. 2A, 2B, 2C and 2D, the display apparatus 200 comprises at least one image renderer, depicted as an image renderer 202; at least one light source per eye, depicted as a light source 204; at least one controllable scanning mirror per eye, depicted as a controllable scanning mirror 206; at least two actuators, depicted as actuators 208 and 210 associated with the at least one controllable scanning mirror 206; means for detecting a gaze direction (not shown) of a user; and a processor (not shown) coupled in communication with the at least one image renderer 202, the at least one light source 204, the at least one controllable scanning mirror 206, the at least two actuators 208 and 210 and the means for detecting the gaze direction. As shown, the light source 204 is operable to emit a substantially collimated and monochromatic light beam, depicted as a ray A. The controllable scanning mirror 206 is arranged to reflect the light beam A towards a projection surface 212, wherein the scanning mirror 206 is to be controlled to change a direction in which the light beam A is reflected. The gaze direction is to be detected when the display apparatus 200 in operation is worn by the user In operation, the processor is configured to (a) obtain an input image and determine, based upon the detected gaze direction of the user, a region of visual accuracy of the input image; (b) process the input image to generate at least a context image 214 and a focus image 216, the context image 214 having a first resolution, the focus image 216 having a second resolution, the second resolution being higher than the first resolution, wherein the focus image 216 substantially corresponds to the region of visual accuracy of the input image; (c) determine, based upon the detected gaze direction of the user, a focus area 218 within the projection surface 212 over which the focus image 216 is to be drawn, the focus area 218 being only a portion of an entire projection area of the projection surface 212; (d) render the context image 214 via the at least one image renderer 202; (e) draw the focus image 216 via the light source 204 and the controllable scanning mirror 206; and (f) control the at least two actuators 208 and 210 to align the controllable scanning mirror 206 in a manner that the focus image 216 is drawn over the determined focus area 218 within the projection surface 212. As shown, a projection of the drawn focus image 216 is optically combined with a projection of the rendered context image 214, at the projection surface 212, to create a visual scene. The processor is configured to perform steps (d), (e) and (f) substantially simultaneously.

Figure 2A:
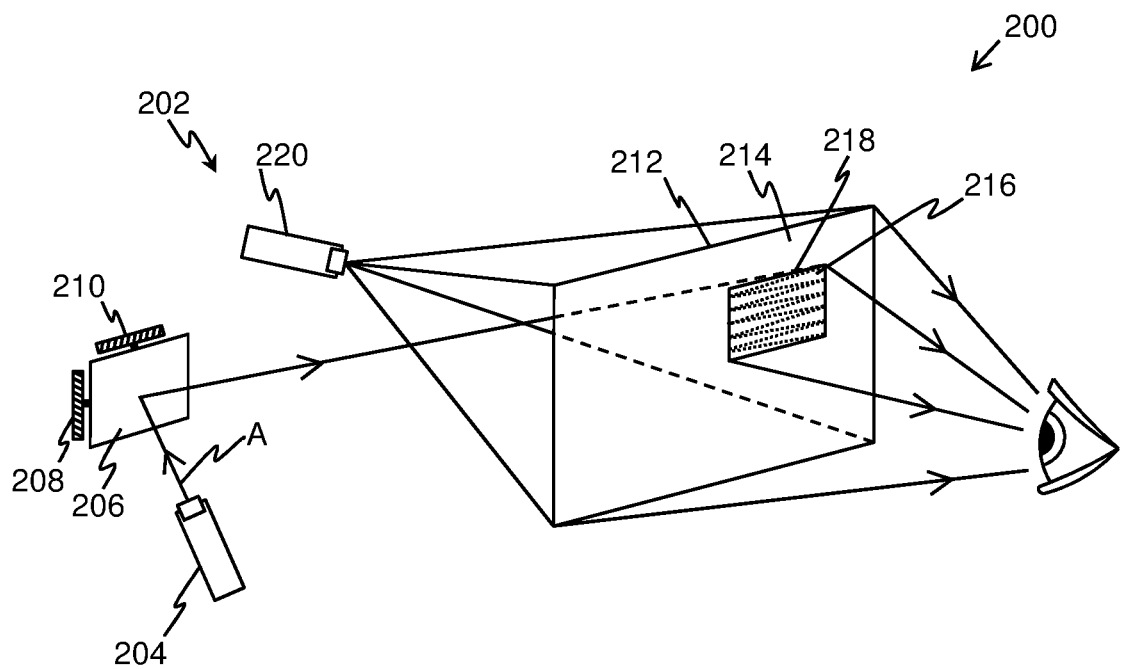
FIGS. 2A, 2B, 2C and 2D illustrate exemplary implementations of a display apparatus, in accordance with various embodiments of the present disclosure.
Figure 2B:
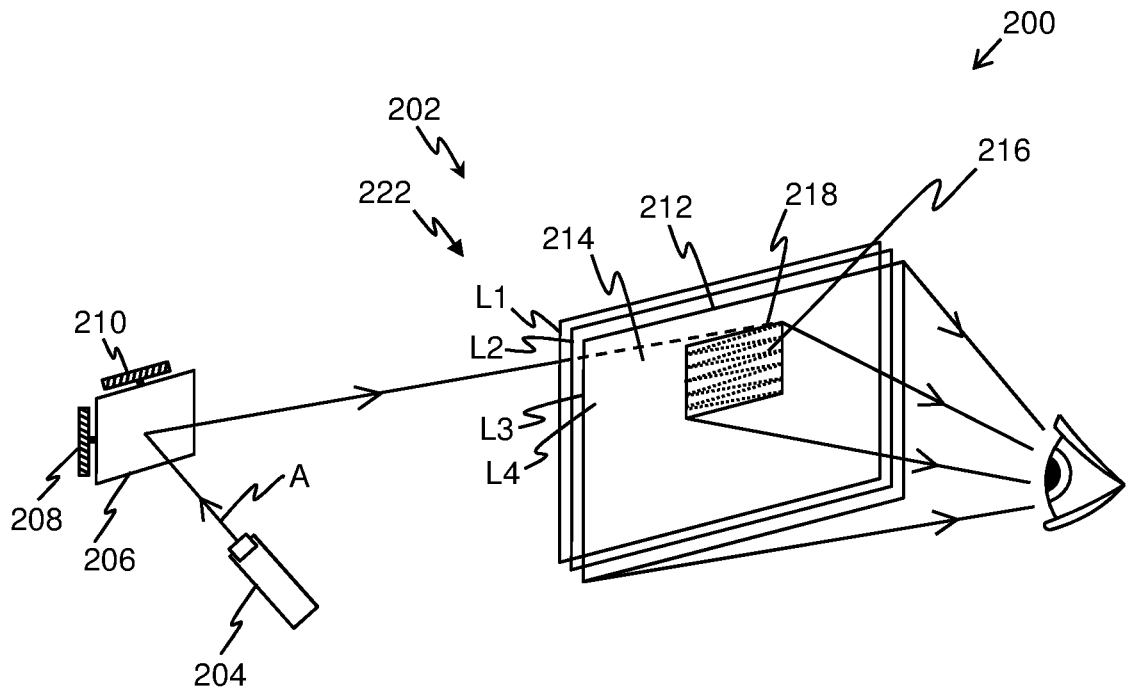
Figure 2C:
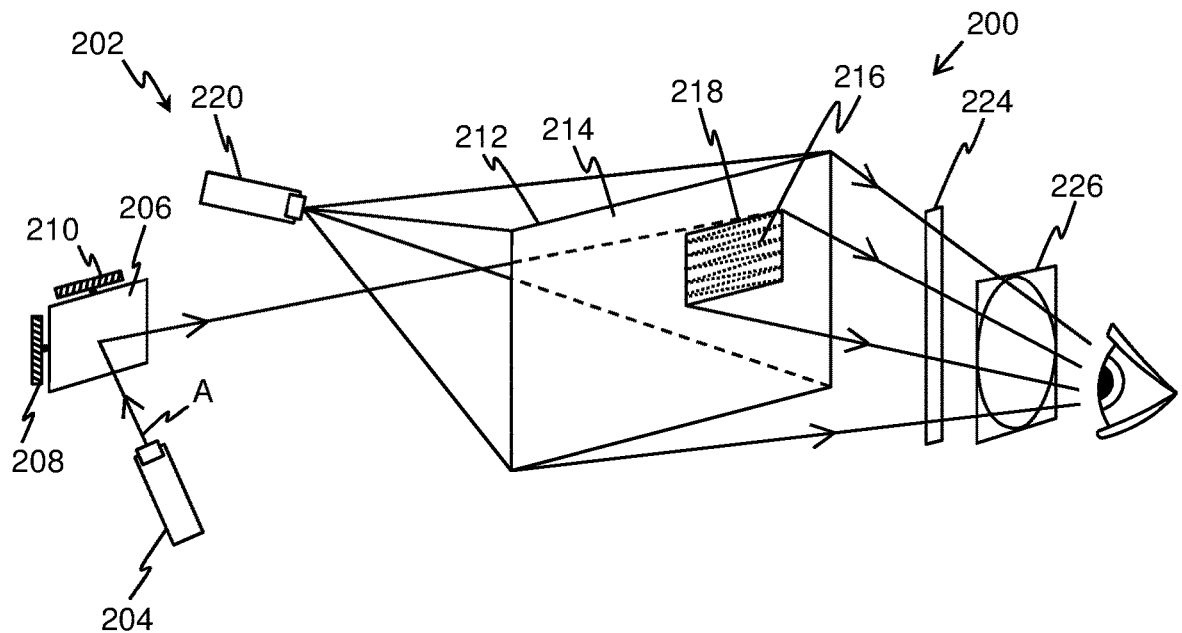

In FIGS. 2A, 2B and 2C, the at least one image renderer 202 comprises the projection surface 212, the context image 214 being projected onto the projection area of the projection surface 212. In such an instance, the at least one image renderer 202 further comprises at least one context image projector 220 for projecting the context image 214 onto the projection surface 212.

In FIG. 2B, the at least one image renderer 202 comprises at least one display 222 for rendering the context image 214, wherein the at least one display 222 comprises a multi-layered structure (for example, including layers L1, L2, L3 and L4), and wherein the projection surface 212 is implemented by way of at least one layer (for example, such as the layer L3) of the multi-layered structure of the at least one display 222.

Figure 2D:
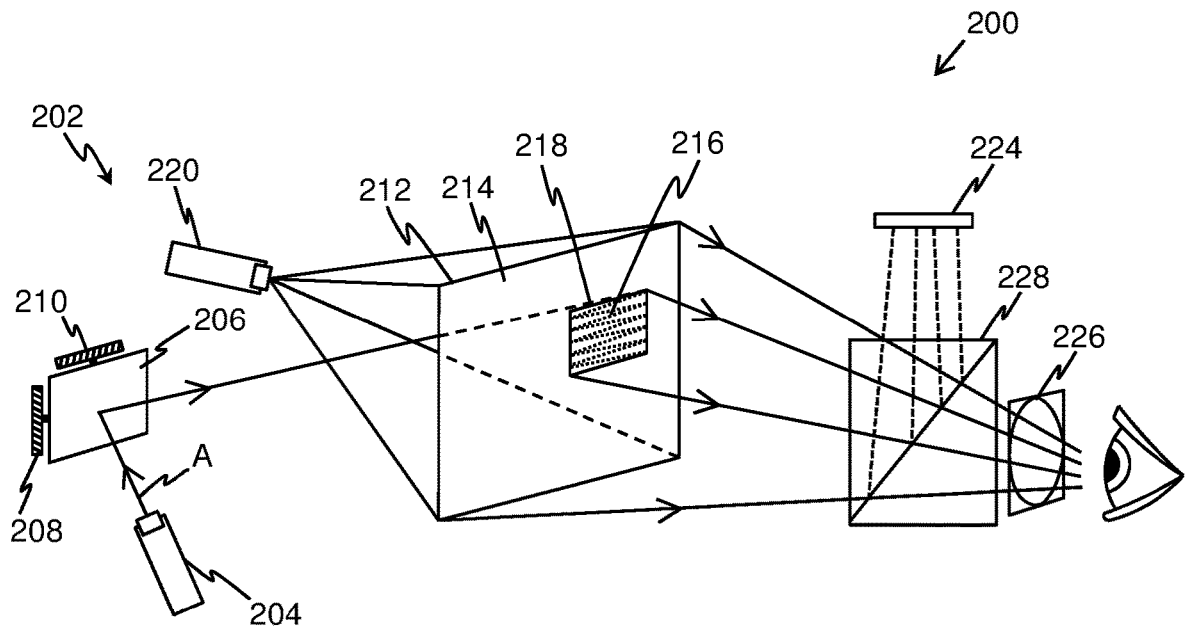

In FIGS. 2C and 2D, the display apparatus 200 further comprises a light-sensing element 224, the light-sensing element 224 being operable to sense an intensity of the light beam A; and means (not shown) for stopping the light beam A from reaching the user's eye. In such a case, the processor is configured to detect when the intensity of the light beam A exceeds a predefined threshold value, and to use said means to stop the light beam A when the intensity of the light beam A exceeds the predefined threshold value. Furthermore, the display apparatus 200 optionally comprises an exit optical element 226 configured to direct the projection of the rendered context image 214 and the projection of the drawn focus image 216 towards a user's eye, when the display apparatus 200 is worn by the user.

In FIG. 2D, the display apparatus 200 further comprises a partially-reflective optical element 228 arranged on an optical path of the projections of the rendered context and focus images, wherein the partially-reflective optical element 228 is configured to direct the light beam A towards the light-sensing element 224.

Figure 3:
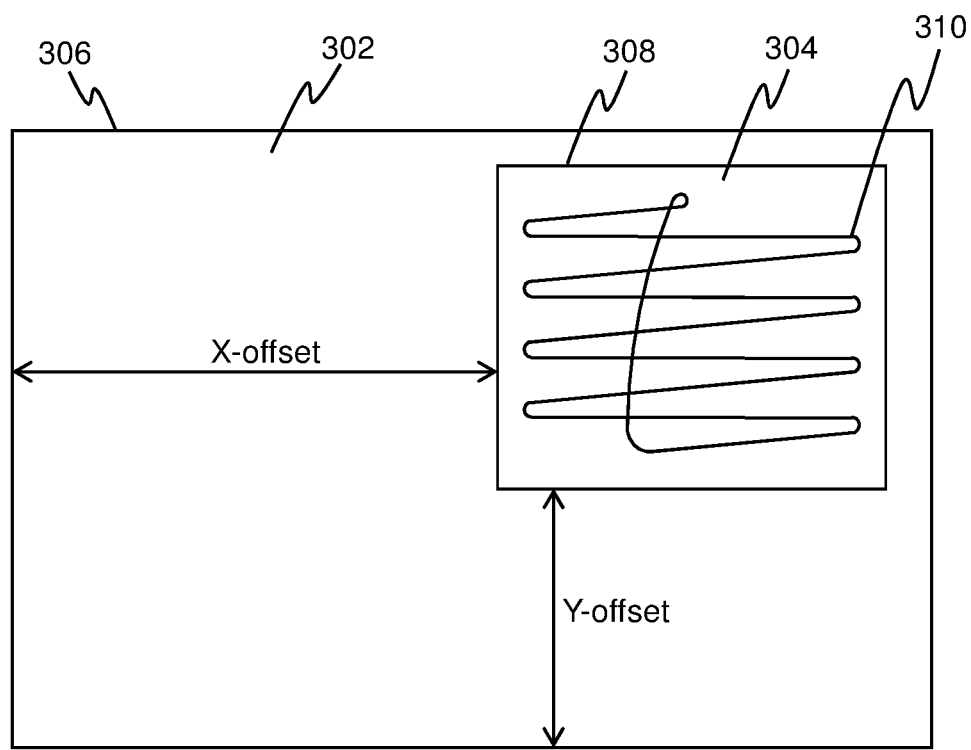
FIG. 3 illustrates an example of a context image and a focus image, in accordance with an embodiment of the present disclosure.
Figure 3:
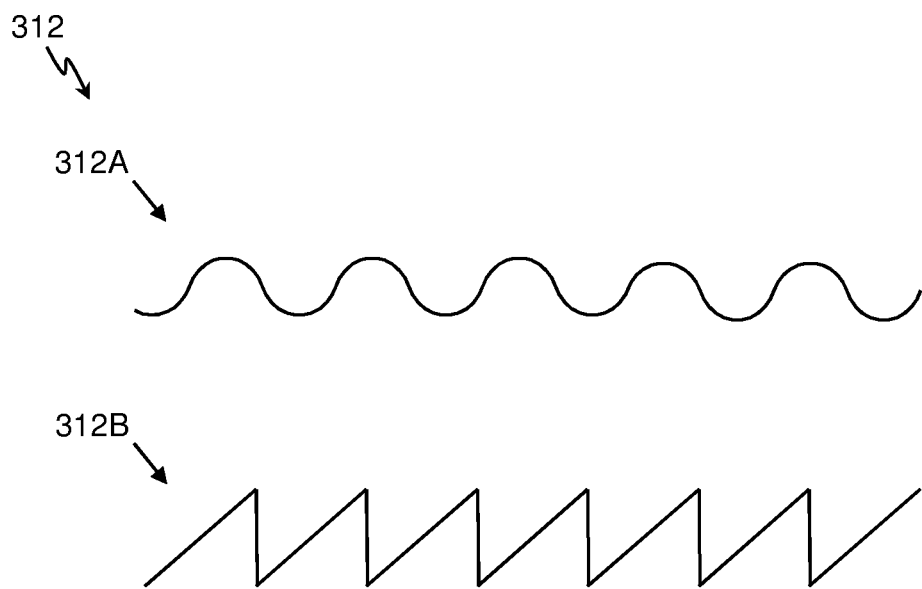

Referring to FIG. 3, illustrated is an example of a context image 302 and a focus image 304, in accordance with an embodiment of the present disclosure. As shown, the context image 302 is rendered at an entire projection area of a projection surface 306 whereas the focus image 304 is drawn within a focus area 308 of the projection surface 306. Notably, the focus area 308 is only a portion of the entire projection area of the projection surface 306. Furthermore, a projection of the drawn focus image 304 and a projection of the rendered context image 302 are optically combined to create a visual scene. A processor (not shown) of a display apparatus (not shown) is optionally configured to generate an offset signal, based upon a location of the focus area 308 relative to the entire projection area of the projection surface 306, and to control at least two actuators (not shown) using the offset signal to align at least one controllable scanning mirror (not shown). The aforesaid alignment of the at least one controllable scanning mirror allows for drawing the focus image 304 within the desired focus area 308. Exemplary values of the offset signal are depicted as X-offset corresponding to an X-axis offset signal and Y-offset corresponding to a Y-axis offset signal.

Furthermore, there is depicted a scanning pattern 310 that is to be swept by the at least one controllable scanning mirror for drawing the focus image 304 within the focus area 308. For example, the scanning pattern 310 is a raster scanning pattern. The processor is optionally configured to generate a scanning signal 312, and to drive the at least one controllable scanning mirror using the scanning signal 312. Notably, the scanning signal 312 controls a manner in which the at least one scanning mirror sweeps the scanning pattern 310 whilst drawing the focus image 304. As an example, for the raster scanning pattern 310, the scanning signal 312 comprises a horizontal scanning signal 312A which is depicted as a sinusoidal signal, and a vertical scanning signal 312B which is depicted as a saw-tooth signal.

Figure 4:
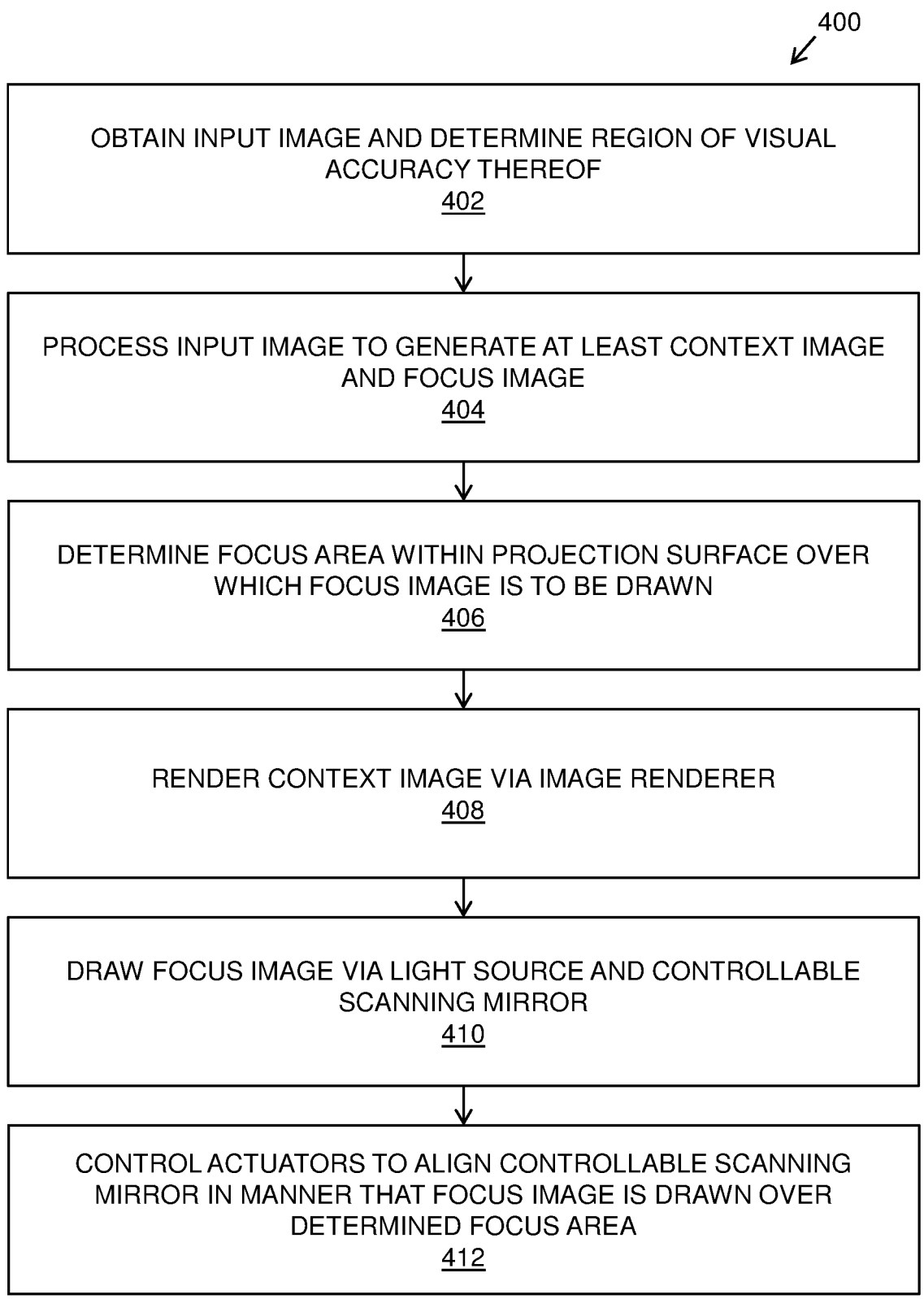
FIG. 4 illustrates steps of a method of displaying, via a display apparatus, in accordance with an embodiment of the present disclosure.

Referring to FIG. 4, illustrated are steps of a method 400 of displaying, via a display apparatus, in accordance with an embodiment of the present disclosure. At step 402, an input image is obtained and a region of visual accuracy of the input image is determined based upon the detected gaze direction of the user. At step 404, the input image is processed to generate at least a context image and a focus image. The context image has a first resolution, the focus image has a second resolution, the second resolution being higher than the first resolution, wherein the focus image substantially corresponds to the region of visual accuracy of the input image. At step 406, a focus area within a projection surface over which the focus image is to be drawn, is determined, based upon the detected gaze direction of the user. The focus area is only a portion of an entire projection area of the projection surface. At step 408, the context image is rendered via the at least one image renderer. At step 410, the focus image is drawn via the at least one light source and the at least one controllable scanning mirror, wherein the step 410 of drawing comprises driving the at least one light source to emit a substantially collimated and monochromatic light beam and driving the at least one controllable scanning mirror to change a direction in which the light beam is reflected. At step 412, the at least two actuators are controlled to align the at least one controllable scanning mirror in a manner that the focus image is drawn over the determined focus area within the projection surface.

The steps 402 to 412 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A display apparatus comprising:
    at least one image renderer;
    at least one light source per eye, the at least one light source being operable to emit a substantially collimated and monochromatic light beam;
    at least one controllable scanning mirror per eye, the at least one controllable scanning mirror being arranged to reflect the light beam towards a projection surface, wherein the at least one scanning mirror is to be controlled to change a direction in which the light beam is reflected;
    at least two actuators associated with the at least one controllable scanning mirror;
    means for detecting a gaze direction of a user, wherein the gaze direction is to be detected when the display apparatus in operation is worn by the user; and
    a processor coupled in communication with the at least one image renderer, the at least one light source, the at least one controllable scanning mirror, the at least two actuators and the means for detecting the gaze direction, wherein the processor is configured to:
    (a) obtain an input image and determine, based upon the detected gaze direction of the user, a region of visual accuracy of the input image;
    (b) process the input image to generate at least a context image and a focus image, the context image having a first resolution, the focus image having a second resolution, the second resolution being higher than the first resolution, wherein the focus image substantially corresponds to the region of visual accuracy of the input image;
    (c) determine, based upon the detected gaze direction of the user, a focus area within the projection surface over which the focus image is to be drawn, the focus area being only a portion of an entire projection area of the projection surface;
    (d) render the context image via the at least one image renderer;
    (e) draw the focus image via the at least one light source and the at least one controllable scanning mirror; and
    (f) control the at least two actuators to align the at least one controllable scanning mirror in a manner that the focus image is drawn over the determined focus area within the projection surface,
    wherein the processor is configured to perform (d), (e) and (f) substantially simultaneously, and wherein a projection of the drawn focus image is optically combined with a projection of the rendered context image to create a visual scene;
    wherein the processor is configured to repeat (a) to (f) for a sequence of input images, and wherein when repeating (a) to (f) the processor is further configured to:
    (g) change a location of the focus area on the projection surface based upon a change in the gaze direction of the user;
    (h) control the at least two actuators to re-align the at least one controllable scanning mirror with respect to the change in the location of the focus area on the projection surface;
    (i) predict an extent to which the at least one controllable scanning mirror is unstable until re-aligned; and
    (j) determine which pixel of the drawn focus image is to be drawn while the at least one controllable scanning mirror is unstable.

2. The display apparatus of claim 1, wherein the processor is configured to generate an offset signal based upon a location of the focus area relative to the entire projection area of the projection surface, and to control the at least two actuators using the offset signal to align the at least one controllable scanning mirror.

3. The display apparatus of claim 1, wherein the processor is configured to drive the at least one light source based upon pixel data of the focus image and a scanning pattern swept by the at least one controllable scanning mirror.

4. The display apparatus of claim 1, wherein the processor is configured to generate a scanning signal based upon electromechanical characteristics of the at least one controllable scanning mirror, and to drive the at least one controllable scanning mirror using the scanning signal.

5. The display apparatus of claim 4, wherein the scanning signal is a phase-locked signal that is synchronous with pixel readout from a frame buffer, the frame buffer storing pixel data of the focus image.

6. The display apparatus of claim 4, wherein the scanning signal is to be generated based upon resonant properties of the at least one controllable scanning mirror.

7. The display apparatus of claim 1, wherein the at least one image renderer comprises the projection surface, the context image being projected onto the projection area of the projection surface.

8. The display apparatus of claim 1, wherein the processor is configured to mask a region of the context image that substantially corresponds to the region of visual accuracy of the input image, wherein the projections of the drawn focus image and the rendered context image are optically combined in a manner that the projection of the drawn focus image substantially overlaps with the projection of the masked region of the rendered context image.

9. The display apparatus of claim 1, further comprising:
    a light-sensing element, the light-sensing element being operable to sense an intensity of the light beam; and
    means for stopping the light beam from reaching the user's eye,
    wherein the processor is configured to detect when the intensity of the light beam exceeds a predefined threshold value, and to use said means to stop the light beam when the intensity of the light beam exceeds the predefined threshold value.

10. The display apparatus of claim 1, further comprising:
an accelerometer, the accelerometer being operable to sense a pattern in which the at least one controllable scanning mirror vibrates; and
means for stopping the light beam from reaching the user's eye,
wherein the processor is configured to detect when the sensed pattern is different from a predefined pattern that is recognized for the at least one controllable scanning mirror, and to use said means to stop the light beam when the sensed pattern is different from the predefined pattern.

11. The display apparatus of claim 1, wherein the processor is configured to, while the at least one controllable scanning mirror is unstable, randomly select the pixel to be drawn from a frame buffer to accommodate a non-linear scanning action of the at least one controllable scanning mirror while the at least one controllable scanning mirror is unstable.

12. A method of displaying, via a display apparatus comprising at least one image renderer, at least one light source per eye, at least one controllable scanning mirror per eye, at least two actuators associated with the at least one controllable scanning mirror and means for detecting a gaze direction of a user, the method comprising:
(a) obtaining an input image and determining, based upon the detected gaze direction of the user, a region of visual accuracy of the input image;
(b) processing the input image to generate at least a context image and a focus image, the context image having a first resolution, the focus image having a second resolution, the second resolution being higher than the first resolution, wherein the focus image substantially corresponds to the region of visual accuracy of the input image;
(c) determining, based upon the detected gaze direction of the user, a focus area within a projection surface over which the focus image is to be drawn, the focus area being only a portion of an entire projection area of the projection surface;
(d) rendering the context image via the at least one image renderer;
(e) drawing the focus image via the at least one light source and the at least one controllable scanning mirror, wherein the step of drawing comprises driving the at least one light source to emit a substantially collimated and monochromatic light beam and driving the at least one controllable scanning mirror to change a direction in which the light beam is reflected; and
(f) controlling the at least two actuators to align the at least one controllable scanning mirror in a manner that the focus image is drawn over the determined focus area within the projection surface,
wherein the steps (d), (e) and (f) are performed substantially simultaneously, and wherein a projection of the drawn focus image is optically combined with a projection of the rendered context image to create a visual scene;
wherein the steps (a) to (f) are repeated for a sequence of input images, and wherein when repeating steps (a) to (f) further comprises:
(g) changing a location of the focus area on the projection surface based upon a change in the gaze direction of the user;
(h) controlling the at least two actuators to re-align the at least one controllable scanning mirror with respect to the change in the location of the focus area on the projection surface;
(i) predicting an extent to which the at least one controllable scanning mirror is unstable until re-aligned; and
(j) determining which pixel of the drawn focus image is to be drawn while the at least one controllable scanning mirror is unstable.

13. The method of claim 12, further comprising generating an offset signal based upon a location of the focus area relative to the entire projection area of the projection surface; and controlling the at least two actuators using the offset signal to align the at least one controllable scanning mirror.

14. The method of claim 12, further comprising driving the at least one light source based upon pixel data of the focus image and a scanning pattern swept by the at least one controllable scanning mirror.

15. The method of claim 12, further comprising generating a scanning signal based upon electromechanical characteristics of the at least one controllable scanning mirror; and driving the at least one scanning mirror using the scanning signal.

16. The method of claim 15, wherein the scanning signal is a phase-locked signal that is synchronous with pixel readout from a frame buffer, the frame buffer storing pixel data of the focus image.

17. The method of claim 15, wherein the scanning signal is generated based upon resonant properties of the at least one controllable scanning mirror.

18. The method of claim 12, further comprising masking a region of the context image that substantially corresponds to the region of visual accuracy of the input image, wherein the projections of the drawn focus image and the rendered context image are optically combined in a manner that the projection of the drawn focus image substantially overlaps with the projection of the masked region of the rendered context image.

19. The method of claim 12, wherein the display apparatus further comprises a light-sensing element and means for stopping the light beam from reaching the user's eye, the method comprising sensing, via the light-sensing element, an intensity of the light beam; detecting when the intensity of the light beam exceeds a predefined threshold value; and using said means to stop the light beam when the intensity of the light beam exceeds the predefined threshold value.

20. The method of claim 12, wherein the display apparatus further comprises an accelerometer and means for stopping the light beam from reaching the user's eye, the method comprising sensing, via the accelerometer, a pattern in which the at least one controllable scanning mirror vibrates; detecting when the sensed pattern is different from a predefined pattern that is recognized for the at least one controllable scanning mirror; and using said means to stop the light beam when the sensed pattern is different from the predefined pattern.

21. The method of claim 12, further comprising, while the at least one controllable scanning mirror is unstable, randomly selecting the pixel to be drawn from a frame buffer to accommodate a non-linear scanning action of the at least one controllable scanning mirror while the at least one controllable scanning mirror is unstable.

* * * * *